Aug. 16, 1960 M. P. WHITE 2,949,545
TIMING CIRCUIT
Filed Nov. 14, 1957
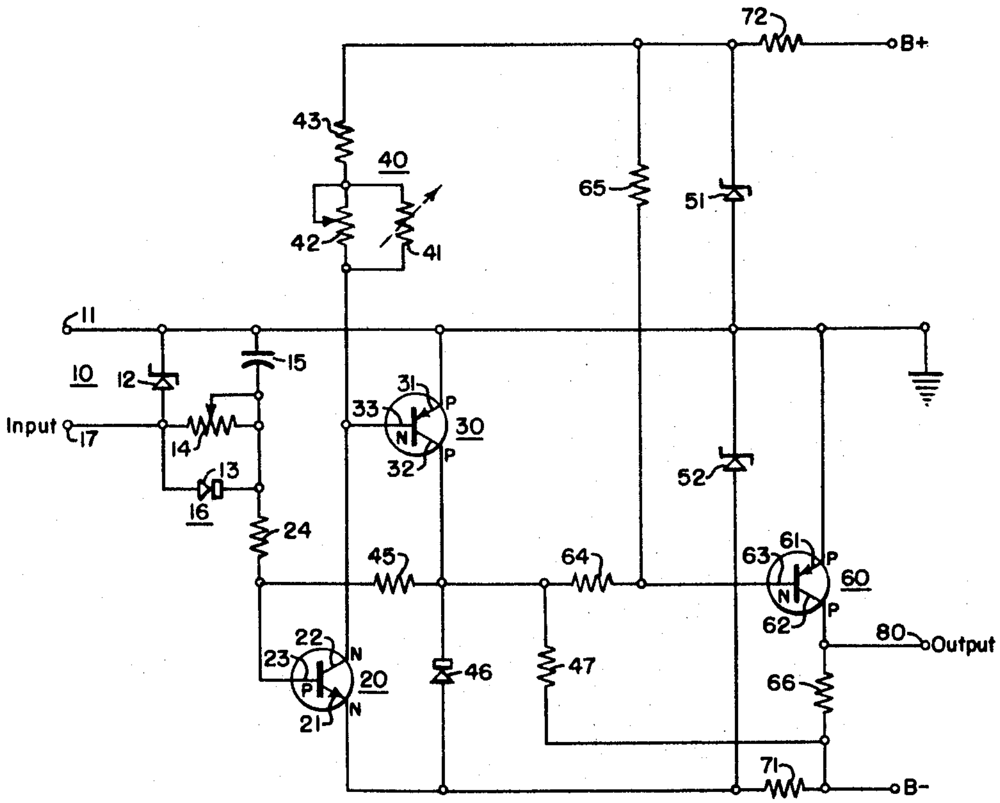
WITNESSES:
Bernard R. Gieguey
Myron E. Click
INVENTOR
Marshall P. White
BY F. E. Browder
ATTORNEY United States Patent Office 2,949,545

Patented Aug. 16, 1960

2,949,545

TIMING CIRCUIT

Marshall P. White, Grand Haven, Mich., assignor to Westinghouse Electric Corporation, East Pittsburgh, Pa., a corporation of Pennsylvania Filed Nov. 14, 1957, Ser. No. 696,424

6 Claims. (Cl. 307—88.5)

This invention relates to timing circuits in general, and in particular to timing circuits utilizing transistors.

It is an object of this invention to provide an improved static timing circuit.

It is another object of this invention to provide an improved static timing circuit which is very reliable and easily adjustable over the range to be timed.

It is a further object of this invention to provide an improved static timing circuit which provides instantaneous reset and is easily changed from an "off" delay to an "on" delay.

Further objects of this invention will become apparent from the following description when taken in conjunction with the accompanying drawing. In said drawing, for illustrative purposes only, there is shown a preferred form of the invention.

The drawing is a schematic diagram of a transistorized timing circuit, which is temperature and voltage compensated, illustrating the teachings of this invention.

In general, the apparatus illustrated in the drawing comprises an input means 10 for applying an input, capacitive means 15 for storing energy, three stages of three electrode semi-conductor transistors 20, 30 and 60, voltage compensating means 51 and 52, a temperature compensating network 40 and output terminal means 80.

The input means 10 comprises a semi-conductor Zener diode 12 connected between the input terminal 17 and the common or grounded terminal 11. The Zener breakdown effect of the semi-conductor Zener diode 12 is to be used so that this diode 12 is polarized with its forward conducting direction towards the terminal 11. A charge-discharge circuit 16 is also included in the input means 10.

The input semi-conductor transistor 20 comprises an emitter electrode 21, a collector electrode 22 and a base electrode 23. The transistor 20 is shown as an N–P–N type transistor although a P–N–P type transistor may be used as will be explained hereinafter. The base electrode 23 is connected through a series resistor 24 and a charge-discharge circuit 16, comprising a rectifier diode 13 and an adjustable resistor 14 connected in parallel, to the input terminal 17. A capacitive means 15 is connected between the junction of the series resistor 24 and the charge-discharge circuit 16 and the grounded terminal 11. The emitter electrode 21 is connected to a source of negative direct current potential through a current limiting resistor 71. The collector electrode 22 is connected to a source of positive direct current potential through a temperature compensating circuit 40 and a current limiting resistor 72. The temperature compensating circuit 40 comprises a resistor 43 and an adjustable resistor 42 connected in series, with a thermistor 41 connected in parallel with the adjustable resistor 42.

The intermediate transistor 30 comprises an emitter electrode 31, a collector electrode 32 and a base electrode 33. The transistor 30 is illustrated as a P–N–P type although N–P–N types may be used as will be explained hereinafter. The base electrode 33 of the transistor 30 is connected to the collector electrode 22 of the transistor 20. The emitter electrode 31 is connected to the grounded terminal 11. The collector electrode 32 is connected to the base electrode 23 of the transistor 20 by a feedback resistor 45. The collector electrode 32 is also connected to the source of negative potential through a parallel circuit, one branch of which comprises a rectifying diode 46 and the current limiting resistor 71, and the other branch of which comprises a resistor 47.

The output transistor 60 comprises an emitter electrode 61, a collector electrode 62 and a base electrode 63. The transistor 60 is illustrated as a P–N–P type although N–P–N types may be used as will be explained hereinafter. The base electrode 63 of the transistor 60 is connected to the collector electrode 32 of the transistor 30 by a resistor 64. The base electrode 63 is also connected to the source of positive potential through a resistor 65 and the current limiting resistor 72. The emitter electrode 61 of the transistor 60 is connected to the grounded terminal 11. The collector electrode 62 is connected through a current limiting resistor 66 to the source of negative potential.

The grounded terminal 11 is connected to the source of positive potential through a Zener-type semi-conductor diode 51 and the current limiting resistor 72. The terminal 11 is also connected to the source of negative potential through a Zener-type semi-conductive diode 52 and the current limiting resistor 71. An output terminal 80 is connected to the collector electrode 62 of the transistor 60.

The operation of the apparatus illustrated in Fig. 1 is as follows. Assuming that the capactive means 15 has a stored charge of energy with the grounded side being at a positive polarity with respect to the other side, when the input terminal 17 is shorted to the grounded terminal 11, the capacitive means 15 will be discharged through the rectifying diode 13. The discharge of the capactive means 15 through the diode 13 will allow current flow through the resistor 24 to the base electrode 23 of the transistor 20. Since the transistor 20 is of the N–P–N type this current flow through the resistor 24 will turn the transistor 20 "on" and allow it to conduct. The conduction of the transistor 20 will lower the potential of the collector electrode 22 thereby lowering the potential of the base electrode 33 of the transistor 30. Since the transistor 30 is of the P–N–P type, the transistor 30 will start to conduct and will be driven into saturation. The semi-conductor diode 46 will now be reverse biased and since the transistor 60 is of the P–N–P type, the base electrode 63 will be brought to a positive potential with respect to the emitter 61 of the transistor 60 and the transistor 60 will be "cut-off." Since the transistor 60 is "cut-off" there will be no conduction in the emitter 61-collector 62 circuit and an output will appear at the terminal 80 with respect to ground.

The semi-conductive diodes 51 and 52, by utilizing the Zener break-down effect of said diodes, will hold constant voltage levels of the proper magnitude and polarity on the switching part of the timing circuit regardless of normal line variations. The Zener-type diode 12 will hold the input signal level constant when an input of the proper type is provided. The proper input at the terminal 17 for the preferred embodiment illustrated in the drawings would be a negative voltage that would charge the capacitive means 15 to the level desired as maintained by the Zener-type diode 12. The capacitive means 15 will charge through the adjustable resistor 14, the setting of which controls the timing period for the circuit. As the potential on the capacitive means 15 builds up, the base electrode 23 of the transistor 20 will become more negative with respect to the emitter electrode 21 and the collector electrode 22, thereby starting to cut the transistor 20 "off." As the transistor 20 starts to cut "off," the potential on the collector electrode 22 will start to rise thereby raising the potential on the base electrode 33 of the transistor 30 which will bring the transistor 30 out of saturation when a predetermined voltage level is reached across the capacitive means 15. The positive voltage feedback through the resistor 45 from the collector electrode 32 of the transistor 30 to the base electrode 23 of the transistor 20, which is helping to hold the transistor 30 "on," will decrease, resulting in an overall cascade effect between the transistors 20 and 30 which will drive the transistor 30 into "cut-off." The output transistor 60 will therefore be driven from full "cut-off" to full saturation in a short time thereby cutting off the output at the terminal 80.

The time delay between the application of the input signal and the "off" condition at the output terminal 80 will be determined primarily by the setting of the adjustable resistor 14 and the value of the capacitive means 15. The time delay will also vary almost directly with the gain of the transistor 20.

If the rectifying diode 13 is reversed, the timing capacitor 15 will charge through the diode 13 when a negative input is applied and discharge through the adjustable resistor 14 and the resistor 24 when the input terminal 17 is shorted to the terminal 11. Thus, there would then be a delay before the output at the terminal 80 appears, i.e. an "on" delay.

The rectifying diode 46, resistor 47 combination is utilized to obtain a large swing in potential of the collector electrode 32 of the transistor 30 for feedback purposes. The connection of the base electrode 63 of the transistor 60 to the source of positive potential by the resistor 65 assures "cut-off" of the transistor 60 at elevated operating temperatures of the circuit. The network comprising resistor 43, thermistor 41, adjustable resistor 42, also provides positive bias to the base electrode 33 of the transistor 30 to assure "cut-off" of the transistor 30 at elevated operating temperatures. In addition, this thermistor-resistor network may be adjusted to provide temperature compensation. The timing period may be noted at the maximum continuous allowable temperature of the circuit and then resistor 42 adjusted to obtain the same time period at room temperature. The resistance of the thermistor 41 will be low at the maximum continuous allowable temperature of the circuit while the adjustable resistor 42 will have little effect on the overall combination at this temperature. However, the thermistor 41 will have a rather large resistance at room temperature and the adjustable resistor 42 will greatly determine the effective resistance of the overall network 40.

Although N–P–N and P–N–P types, respectively, of transistors have been used in the embodiment illustrated in the invention in specie cases the opposite type of transistors may be used if the polarities of said supply potentials and biasing are properly reversed.

In conclusion, it is pointed out that while the illustrated example constitutes a practical embodiment of my invention, I do not limit myself to the exact details shown, since modifications of the same may be varied without departing from the spirit of this invention.

I claim as my invention:

1. In a timing circuit, in combination; means for applying an input signal to said timing circuit; capacitive means for storing energy from said input signal; input, intermediate and output transistor means each having three electrodes; feedback means connecting a portion of the output of said intermediate transistor means to the input of said input transistor means; and means for connecting sources of positive and negative direct potentials to said timing circuit; said capacitive means being so connected to said input transistor means that the discharge of stored energy from said capacitive means is operative to bias said input transistor means to conduction; said intermediate transistor means being so connected to the output of said input transistor means that conduction by said input transistor means will bias said intermediate transistor means to conduction; said intermediate transistor means being so connected to said output transistor means that the output of said intermediate transistor means is operative to switch the output state of said output transistor means; said sources of positive and negative direct potential being connected to supply potential to said input, intermediate and output transistor means; said means for connecting said positive and negative direct potentials to said timing circuit including temperature compensating means.

2. In a timing circuit, in combination; means for applying an input signal to said timing circuit; capacitive means for storing energy from said input signal; input, intermediate and output transistor means each having three electrodes; feedback means connecting a portion of the output of said intermediate transistor means to the input of said input transistor means; and means for connecting sources of positive and negative direct potentials to said timing circuit; said capacitive means being so connected to said input transistor means that the discharge of stored energy from said capacitive means is operative to bias said input transistor means to conduction; said intermediate transistor means being so connected to the output of said input transistor means that conduction by said input transistor means will bias said intermediate transistor means to conduction; said intermediate transistor means being so connected to said output transistor means that the output of said intermediate transistor means is operative to switch the output state of said output transistor means; said sources of positive and negative direct potential being connected to supply potential to said input, intermediate and output transistor means; said means for connecting said positive and negative direct potentials to said timing circuit including temperature compensating means and means for maintaining substantially constant potential levels to supply said input, intermediate and output transistor means.

3. In a timing circuit, in combination; means for applying an input signal to said timing circuit; capacitive means for storing energy from said input signal; input, intermediate and output transistor means each having three electrodes; feedback means connecting a portion of the output of said intermediate transistor means to the input of said input transistor means; and means for connecting sources of positive and negative direct potentials to said timing circuit; said means for applying an input signal including a charge-discharge circuit for said capacitive means; said capacitive means being so connected to said input transistor means that the discharge of stored energy from said capacitive means is operative to bias said input transistor means to conduction; said intermediate transistor means being so connected to the output of said input transistor means that conduction by said input transistor means will bias said intermediate transistor means to conduction; said intermediate transistor means being so connected to said output transistor means that the output of said intermediate transistor means is operative to switch the output state of said output transistor means; said sources of positive and negative direct potential being connected to supply potential to said input, intermediate and output transistor means; said means for connecting said positive and negative direct potentials to said timing circuit including temperature compensating means and means for maintaining substantially constant potential levels to supply said input, intermediate and output transistor means.

4. In a timing circuit, in combination; means for applying an input signal to said timing circuit; capacitive means for storing energy from said input signal; input, intermediate and output transistor means each having three electrodes; feedback means connecting a portion of the output of said intermediate transistor means to the input of said input transistor means; and means for connecting sources of positive and negative direct potentials to said timing circuit; said means for applying an input signal including a charge-discharge circuit for said capacitive means and means for maintaining a substantially constant level of said input signal; said capacitive means being so connected to said input transistor means that the discharge of stored energy from said capacitive means is operative to bias said input transistor means to conduction; said intermediate transistor means being so connected to the output of said input transistor means that conduction by said input transistor means will bias said intermediate transistor means to conduction; said intermediate transistor means being so connected to said output transistor means that the output of said intermediate transistor means is operative to switch the output state of said output transistor means; said sources of positive and negative direct potential being connected to supply potential to said input, intermediate and output transistor means; said means for connecting said positive and negative direct potentials to said timing circuit including temperature compensating means and means for maintaining substantially constant potential levels to supply said input, intermediate and output transistor means.

5. In a timing circuit, in combination, means for applying an input signal to said timing circuit; capacitive means for storing energy from said input signal; input, intermediate and output transistor means each having three electrodes; feedback means connecting a portion of the output of said intermediate transistor means to the input of said input transistor means; and means for connecting sources of positive and negative direct potentials to said timing circuit; said means for applying an input signal including a charge-discharge circuit for said capacitive means and means for maintaining a substantially constant level of said input signal; said capacitive means being so connected to said input transistor means that the discharge of stored energy from said capacitive means is operative to bias said input transistor means to conduction; said intermediate transistor means being so connected to the output of said input transistor means that conduction by said input transistor means will bias said intermediate transistor means to conduction; said intermediate transistor means being so connected to said output transistor means that the output of said intermediate transistor means is operative to switch the output state of said output transistor means; said sources of positive and negative direct potential being connected to supply potential to said input, intermediate and output transistor means; said means for connecting said positive and negative direct potentials to said timing circuit including temperature compensating means and means for maintaining substantially constant potential levels to supply said input, intermediate and output transistor means; said temperature compensating means comprising paralleled thermistor and adjustable resistance means.

6. In a timing circuit, in combination; means for applying an input signal to said timing circuit; capacitive means for storing energy from said input signal; input, intermediate and output transistor means each having three electrodes; feedback means connecting a portion of the output of said intermediate transistor means to the input of said input transistor means; and means for connecting sources of positive and negative direct potentials to said timing circuit; said means for applying an input signal including a charge-discharge circuit for said capacitive means and means for maintaining a substantially constant level of said input signal; said capacitive means being so connected to said input transistor means that the discharge of stored energy from said capacitive means is operative to bias said input transistor means to conduction; said intermediate transistor means being so connected to the output of said input transistor means that conduction by said input transistor means will bias said intermediate transistor means to conduction; said intermediate transistor means being so connected to said output transistor means that the output of said intermediate transistor means is operative to switch the output state of said output transistor means; said sources of positive and negative direct potential being connected to supply potential to said input, intermediate and output transistor means; said means for connecting said positive and negative direct potentials to said timing circuit including temperature compensating means and means for maintaining substantially constant potential levels to supply said input, intermediate and output transistor means; said temperature compensating means comprising paralleled thermistor and adjustable resistance means; said means for maintaining substantially constant potential levels comprising semiconductor diodes.

References Cited in the file of this patent

UNITED STATES PATENTS

| | | |
|---|---|---|
| 2,776,382 | Jensen | Jan. 1, 1957 |
| 2,803,815 | Wulfsberg | Aug. 20, 1957 |
| 2,863,067 | Seldner | Dec. 2, 1958 |

OTHER REFERENCES

Louis E. Garner, Jr.: "A Transistor Timer," Radio and Television News, October 1953, pp. 68, 69 and 187.